United States Patent
Gupta et al.

(10) Patent No.: US 12,476,708 B2
(45) Date of Patent: Nov. 18, 2025

(54) APPARATUS, SYSTEM AND METHOD OF VISIBLE LIGHT COMMUNICATION (VLC)

(71) Applicant: Intel Corporation, Santa Clara, CA (US)

(72) Inventors: Jay Vishnu Gupta, Bengaluru (IN); Anshu Agarwal, Bangalore (IN); Mythili R. Hegde, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 718 days.

(21) Appl. No.: 17/710,839

(22) Filed: Mar. 31, 2022

(65) Prior Publication Data

US 2023/0318707 A1 Oct. 5, 2023

(51) Int. Cl.
*H04B 10/116* (2013.01)
*H04B 10/114* (2013.01)
*H04B 10/80* (2013.01)

(52) U.S. Cl.
CPC ....... *H04B 10/116* (2013.01); *H04B 10/1143* (2013.01); *H04B 10/801* (2013.01)

(58) Field of Classification Search
CPC .. H04B 10/116; H04B 10/801; H04B 10/1143
USPC ........................................................ 398/118
See application file for complete search history.

(56) References Cited

U.S. PATENT DOCUMENTS

| | | | | |
|---|---|---|---|---|
| 4,727,600 A | * | 2/1988 | Avakian | H04B 10/1149 398/115 |
| 5,424,859 A | * | 6/1995 | Uehara | H04B 10/116 398/127 |
| 7,239,811 B2 | * | 7/2007 | Yamada | H04B 10/1141 398/131 |
| 2004/0247323 A1 | * | 12/2004 | Morioka | H04B 10/116 398/140 |
| 2010/0232799 A1 | * | 9/2010 | Lueck | H04B 10/1149 398/118 |
| 2014/0308045 A1 | * | 10/2014 | Pederson | G06F 13/4282 398/135 |
| 2015/0092329 A1 | * | 4/2015 | Balasundaram | G06F 1/165 361/679.09 |
| 2017/0160767 A1 | * | 6/2017 | Jones | G06F 1/1658 |
| 2018/0205458 A1 | * | 7/2018 | Hixon | F21S 19/005 |
| 2018/0331757 A1 | * | 11/2018 | Breuer | H04B 10/40 |
| 2020/0153506 A1 | * | 5/2020 | Linnartz | H05B 47/1985 |
| 2022/0385362 A1 | * | 12/2022 | Enhos | H04B 10/516 |

* cited by examiner

*Primary Examiner* — Dalzid E Singh
(74) *Attorney, Agent, or Firm* — Shichrur & Co.

(57) ABSTRACT

For example, an apparatus may include a computing device housing configured to house a motherboard of a computing device, the computing device housing including a base surface, a top surface opposite to the base surface, and a side-wall surface between the base surface and the top surface; and a light communicator configured to extend outward from the side-wall surface of the housing to communicate modulated light of a Visible Light Communication (VLC) transmission in a range of VLC directions.

23 Claims, 6 Drawing Sheets

APPARATUS, SYSTEM AND METHOD OF VISIBLE LIGHT COMMUNICATION (VLC)

TECHNICAL FIELD

Aspects described herein generally relate to Visible Light Communication (VLC).

BACKGROUND

There exist various technologies to support data communication between devices.

Wired communication technologies are based on wired data transfer via a wired connection between devices.

Wireless communication technologies are based on wireless communication via a wireless communication medium, e.g., without using connections like wires, cables and/or a physical medium.

Some wireless communication technologies are based on wireless communication of radio waves.

Visible Light Communication (VLC) is a wireless technology, which utilizes visible light to transmit data between devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
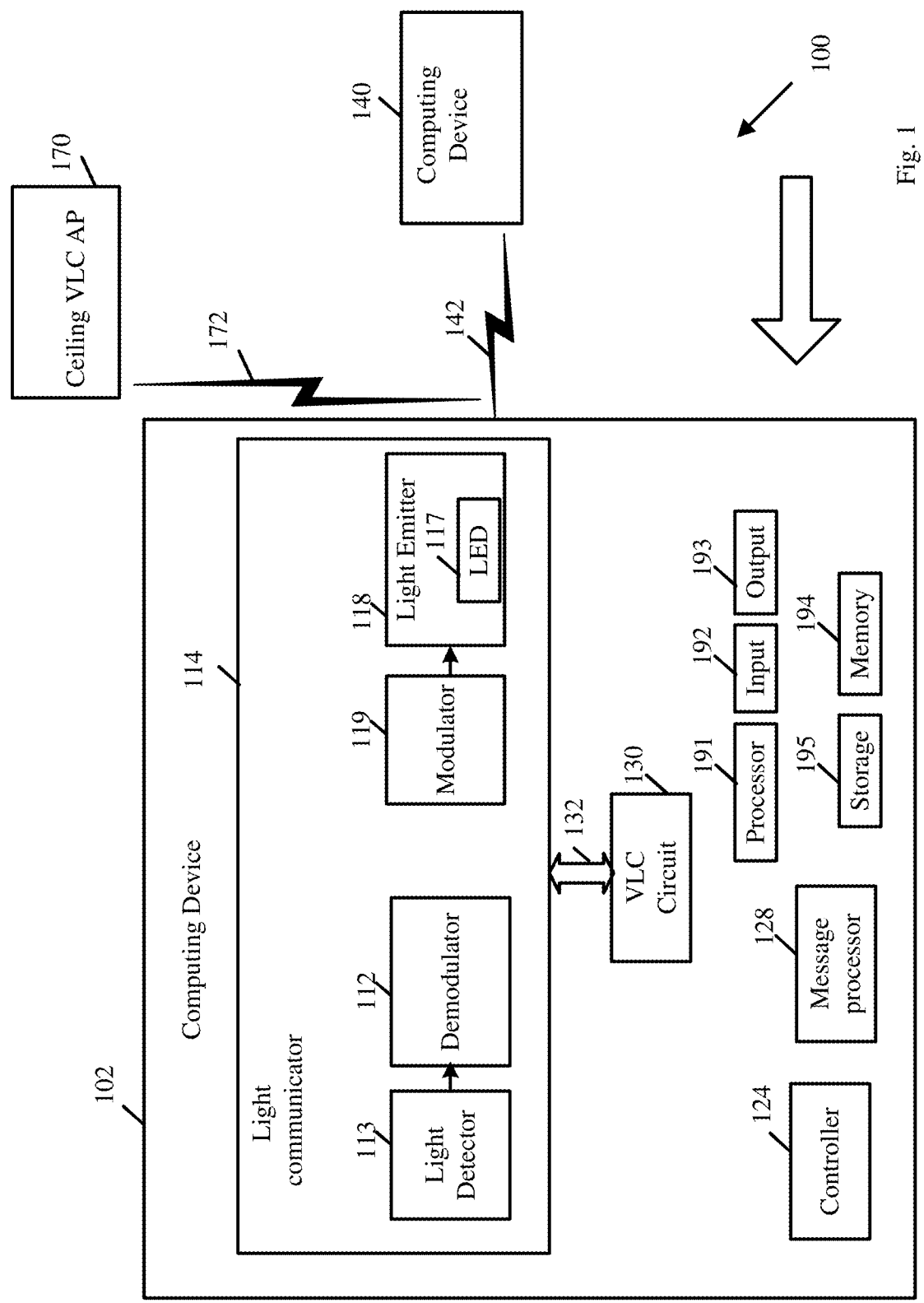
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, an optical wireless communication device, a light communication device, a Visible Light Communication (VLC) device, a Light-Fidelity (Li-Fi) device, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing optical wireless communication specifications and/or protocols, and/or future versions and/or derivatives thereof, devices and/or networks operating in accordance with existing light communication specifications and/or protocols, and/or future versions and/or derivatives thereof, devices and/or networks operating in accordance with existing Visible Light Communication (VLC) specifications and/or protocols, and/or future versions and/or derivatives thereof, devices and/or networks operating in accordance with existing Li-Fi specifications and/or protocols, and/or future versions and/or derivatives thereof, devices and/or networks operating in accordance with existing IEEE 802.11 standards (including IEEE 802.11-2020 (*IEEE 802.11-2020, IEEE Standard for Information Technology—Telecommunications and Information Exchange between Systems Local and Metropolitan Area Networks—Specific Requirements Part* 11*: Wireless LAN Medium Access Control (MAC) and Physical Layer (PHY) Specifications*, December 2020)), and/or future versions and/or derivatives thereof, devices and/or networks operating in accordance with existing cellular specifications and/or protocols, e.g., 3rd Generation Partnership Project (3GPP), 3GPP Long Term Evolution (LTE), Fifth Generation (5G) Specifications, and/or future versions and/or derivatives thereof, units and/or devices which are part of the above networks, and the like.

Some aspects may be used in conjunction with one way and/or two-way optical wireless communication systems and/or devices, light communication systems and/or devices, VLC systems and/or devices, Li-Fi systems and/or devices, radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, optical wireless communication, light communication, VLC, Li-Fi, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting and/or emitting the communication signal, and/or receiving and/or detecting the communication signal. For example, a communication unit, which is capable of communicating a communication signal, may include a transmitter and/or emitter to transmit and/or emit the communication signal to at least one other communication unit, and/or a communication receiver and/or detector to receive and/or detect the communication signal from at least one other communication unit. The verb communicating may be used to refer to the action of transmitting/emitting or the action of receiving/detecting. In one example, the phrase "communicating a transmission signal" may refer to the action of transmitting/ emitting the signal by a first device, and may not necessarily include the action of receiving/detecting the signal by a second device. In another example, the phrase "communicating a transmission signal" may refer to the action of receiving/detecting the signal by a first device, and may not necessarily include the action of transmitting/emitting the signal by a second device. The communication signal may be transmitted and/or received, for example, in the form of wireless communication signals, and/or any other type of signal.

For example, the term "communicating" as used herein with respect to an optical wireless transmission includes transmitting and/or emitting the optical wireless transmission, and/or receiving and/or detecting the optical wireless transmission. For example, a communication unit, which is capable of communicating an optical wireless transmission, may include an emitter to emit the optical wireless transmission to at least one other communication unit, and/or a detector to detect and/or receive the optical wireless transmission from at least one other communication unit. The verb communicating may be used to refer to the action of transmitting/emitting or the action of receiving/detecting. In one example, the phrase "communicating an optical wireless transmission" may refer to the action of transmitting/emitting the signal by a first device, and may not necessarily include the action of receiving/detecting the optical wireless transmission by a second device. In another example, the phrase "communicating an optical wireless transmission" may refer to the action of receiving/detecting the optical wireless transmission by a first device, and may not necessarily include the action of transmitting/emitting the optical wireless transmission by a second device. The optical wireless transmission may be transmitted and/or received, for example, in the form of a visible light wave and/or any other type of optical wave.

As used herein, the term "circuitry" may refer to, be part of, or include, an Application Specific Integrated Circuit (ASIC), an integrated circuit, an electronic circuit, a processor (shared, dedicated, or group) and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a VLC network, e.g., a Li-Fi network. Other aspects may be used in conjunction with any other suitable optical wireless communication network.

Some demonstrative aspects may be used in conjunction with an optical wireless communication network communicating via visible light waves. However, other aspects may be implemented utilizing any other type of light, for example, ultraviolet light, infrared light, and the like.

Reference is now made to FIG. 1, which schematically illustrates a block diagram of a system 100, in accordance with some exemplary aspects.

As shown in FIG. 1, in some demonstrative aspects, system 100 may include one or more computing devices, e.g., a computing device 102 and a computing 140.

In some demonstrative aspects, computing device 102 may include, for example, a UE, a Mobile Device (MD), a mobile phone, a Smartphone, a mobile computer, a laptop computer, an Ultrabook™ computer, a notebook computer, a tablet computer, a PC, a desktop computer, a server computer, a handheld computer, an Internet of Things (IoT) device, a handheld device, a wearable device, a PDA device, a handheld PDA device, an on-board device, an off-board device, a, a mobile or portable device, a non-mobile or non-portable device, a cellular telephone, a PCS device, a PDA device which incorporates a wireless communication device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, or the like.

In some demonstrative aspects, device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of device 102 may be enclosed in a common housing or packaging, and may be interconnected or operably associated using one or more wired or wireless links. In other aspects, components of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a track-ball, a stylus, a microphone, or other suitable pointing device or input device. Output unit 193 includes, for example, a screen, a touch-screen, a flat panel display, a Light Emitting Diode (LED) display unit, an Organic LED (OLED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a Solid State Drive (SSD), or other suitable removable or non-removable storage units. Memory unit 194 and/or storage unit 195, for example, may store data processed by device 102.

In some demonstrative aspects, device 102 and/or device 140 may include, operate as, and/or perform the functionality of one or more STAs, e.g., wireless light STAs. For example, device 102 may include at least one STA.

In some demonstrative aspects, device 102 and/or device 140 may include, operate as, and/or perform the functionality of one or more VLC STAs.

In some demonstrative aspects, device 102 and/or device 140 may include, operate as, and/or perform the functionality of one or more Li-Fi STAs. For example, device 102 may include at least one LiFi STA, and/or device 140 may include at least one LiFi STA.

In one example, a station (STA) may include a logical entity that is a singly addressable instance of a medium access control (MAC) and physical layer (PHY) interface to the wireless medium (WM). The STA may perform any other additional or alternative functionality.

In some demonstrative aspects, system 100 may include a VLC Access Point (AP) device 170. For example, the VLC AP device 170 may be configured to perform one or more operations and/or functionalities of a VLC broadcast device, e.g., as described below.

In some demonstrative aspects, VLC AP 170 may include a ceiling VLC AP device, for example, which may be placed, for example, on a ceiling of a room, floor, building, office, and/or the like.

In some demonstrative aspects, device 102 and/or device 140 may include a non-AP VLC STA. In other aspects, device 170 may include an AP VLC STA.

In one example, an AP may include an entity that contains a VLC station (STA), e.g., one STA, and provides access to distribution services, via a wireless medium (WM) for associated VLC STAs. The VLC AP may perform any other additional or alternative functionality.

In one example, a non-AP VLC STA may include a VLC STA that is not contained within a VLC AP. The non-AP VLA STA may perform any other additional or alternative functionality.

In some demonstrative aspects, computing device 102 may be capable of communicating content, data, information, and/or signals via VLC over a wireless medium (WM).

In some demonstrative aspects, the wireless medium may include, for example, an optical wireless channel, a VLC channel, a LiFi channel, a wireless light communication channel, or the like.

In some demonstrative aspects, device 102 may include at least one light communicator 114 including circuitry and/or logic to perform VLC between device 102, device 140, device 170, and/or one or more other devices, e.g., as described below.

In some demonstrative aspects, computing device 402 may include a connector 132 to electrically connect the light communicator 114 to a VLC circuit 130, e.g., as described below.

In some demonstrative aspects, VLC circuit 130 may include logic and/or circuitry configured to generate VLC communications to be transmitted by light communicator 114, and/or to process VLC communications received by light communicator 114.

In some demonstrative aspects, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between device 102 and one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In some demonstrative aspects, at least part of the functionality of controller 124 may be implemented as part of one or more elements of light communicator 114.

In some demonstrative aspects, at least part of the functionality of controller 124 may be implemented as part of one or more elements of VLC circuit 130.

In other aspects, the functionality of controller 124 may be implemented as part of any other element of device 102.

In some demonstrative aspects, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a VLC channel, for example, by modulating a light wave according to one or more fields of the PPDU. In other aspects, message processor 128 may be configured to perform any other additional or alternative functionality and/or may include any other additional or alternative components to generate and/or process a message to be transmitted.

In some demonstrative aspects, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of light communicator 114.

In some demonstrative aspects, at least part of the functionality of message processor 128 may be implemented as part of controller 124.

In other aspects, the functionality of message processor 128 may be implemented as part of any other element of device 102.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of light communicator 114. For example, the chip or SoC may include one or more elements of controller 124, one or more elements of message processor 128, and/or one or more elements of light communicator 114. In one example, controller 124, message processor 128, and light communicator 114 may be implemented as part of the chip or SoC.

In other aspects, controller 124, message processor 128 and/or light communicator 114 may be implemented by one or more additional or alternative elements of device 102.

In some demonstrative aspects, light communicator 114 may include one or more light receivers (Rx), e.g., light detectors, including circuitry and/or logic to receive VLC frames, blocks, transmission streams, packets, messages, data items, and/or data. For example, light communicator 114 may include a light detector 113.

In some demonstrative aspects, light communicator 114 may include one or more light transmitters (Tx), e.g., light emitters, including circuitry and/or logic to transmit VLC signals frames, blocks, transmission streams, packets, messages, data items, and/or data. For example, light communicator 114 may include a light emitter 118.

In some demonstrative aspects, light communicator 114, light emitter 118, and/or light detector 113 may include circuitry; logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, light communicator 114 may be configured to communicate modulated light having a wavelength in a visible range, e.g., as described below.

In some demonstrative aspects, light communicator 114 may be configured to communicate modulated light having a wavelength in a range between 390 nanometer (nm) and 780 nm, e.g., as described below.

In other aspects, light communicator 114 may be configured to communicate modulated light having any other additional or alternative wavelengths.

In some demonstrative aspects, light emitter 118 may include at least one Light Emitting Diode (LED) 117, e.g., as described below. In other aspects, light emitter 118 may include any other type of light emitting device and/or unit.

In some demonstrative aspects, light communicator 114 may be configured to communicate modulated light of a VLC transmission, e.g., as described below.

In some demonstrative aspects, the VLC transmission may include a Li-Fi transmission according to a Li-Fi Standard.

In other aspects, the VLC transmission may include any other transmission according to any other standard and/or protocol.

In some demonstrative aspects, the modulated light of the VLC transmission may include On-Off-Keying (OOK) modulated light, e.g., as described below.

In other aspects, the modulated light of the VLC transmission may be modulated according to any other modulation technique.

In some demonstrative aspects, the modulated light may include light having a wavelength in a range between 390 nm and 780 nm, e.g., as described below.

In other aspects, the modulated light may be in any other spectrum.

In one example, a Li-Fi spectrum may start after infrared frequencies. For example, the Li-Fi spectrum may include a visible light spectrum, for example, including wavelengths in a range between 390 nm and 780 nm. For example, utilizing the wavelengths in the range between 390 nm and 780 nm for the Li-Fi spectrum may provide a technical solution, which may support a more secured communication medium, and/or may have a very high bandwidth, e.g., an unlimited bandwidth.

In some demonstrative aspects, light emitter 118 may be configured to emit modulated light of a transmitted VLC transmission, e.g., as described below.

In some demonstrative aspects, light communicator 114 may include a modulator 119 configured to generate a modulated signal, for example, based on data to be transmitted in the VLC transmission, e.g., as described below.

In some demonstrative aspects, light emitter 118 may be configured to emit the modulated light of the VLC transmission, for example, based on the modulated signal, e.g., as described below.

Figure 2:
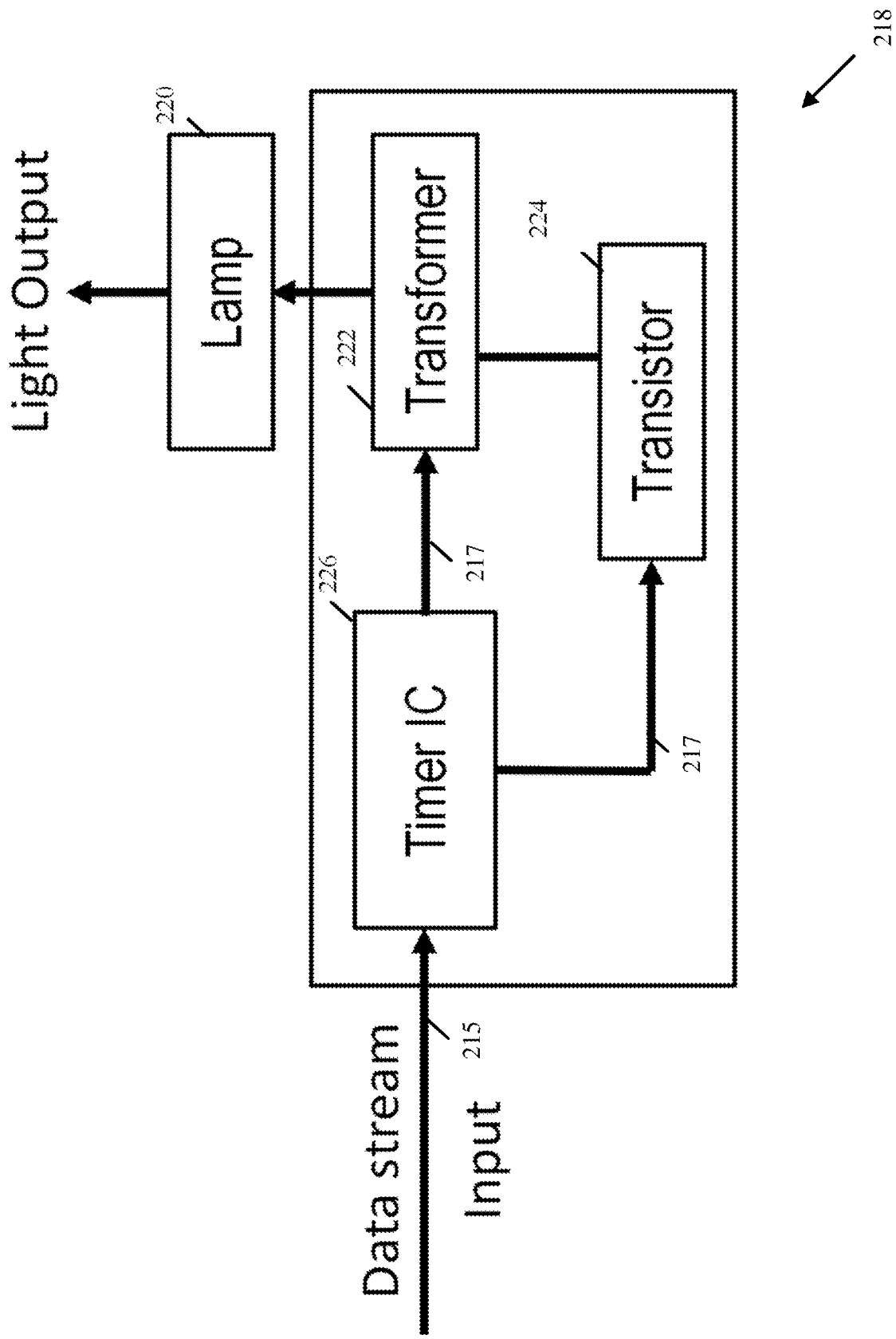
FIG. 2 is a schematic illustration of a light emitter, in accordance with some demonstrative aspects.

Reference is made to FIG. 2, which schematically illustrates a light emitter 218, in accordance with some demonstrative aspects. For example, light emitter 118 (FIG. 1) may be configured to include one or more elements of light emitter 218, and/or to perform one or more operations and/or functionalities of light emitter 218.

In some demonstrative aspects, as shown in FIG. 2, light emitter 218 may include a lamp 220, e.g., a LED lamp.

In some demonstrative aspects, lamp 220 may be configured as a transmitter to transmit information in the form of light, for example, by emitting the light.

In some demonstrative aspects, as shown in FIG. 2, light emitter 218 may include a timer Integrated Chip (IC) 226, which may be configured to process input data 215 to be transmitted in a VLC transmission.

In some demonstrative aspects, timer IC 226 may be used as a voltmeter, and/or as an analog to digital converter, for example, to convert analog input voltage of input data 215 into digital output pulses 217.

In one example, a pulse width of digital output pulses 217 may be proportional to a difference between the analog input voltage and a voltage across a capacitor.

In some demonstrative aspects, as shown in FIG. 2, light emitter 218 may include a transistor 224 configured as a switch, for example, to switchably turn on and turn off a light source, e.g., a LED, a laser, and/or any other light source, of lamp 222, for example, based on input data 215.

For example, transistor 224 may be utilized to modulate the input data 215 over the emitted light, for example, according to an OOK modulation scheme, and/or any other modulation scheme.

In some demonstrative aspects, as shown in FIG. 2, light emitter 218 may include a transformer 222 configured to step up a voltage to drive the lamp 220.

Referring back to FIG. 1, in some demonstrative aspects, light detector 113 may be configured to receive and detect modulated light of a received VLC transmission, e.g., as described below.

In some demonstrative aspects, light communicator 114 may include a demodulator 112 configured to generate demodulated data based on a modulated light of the received VLC transmission, e.g., as described below.

Figure 3:
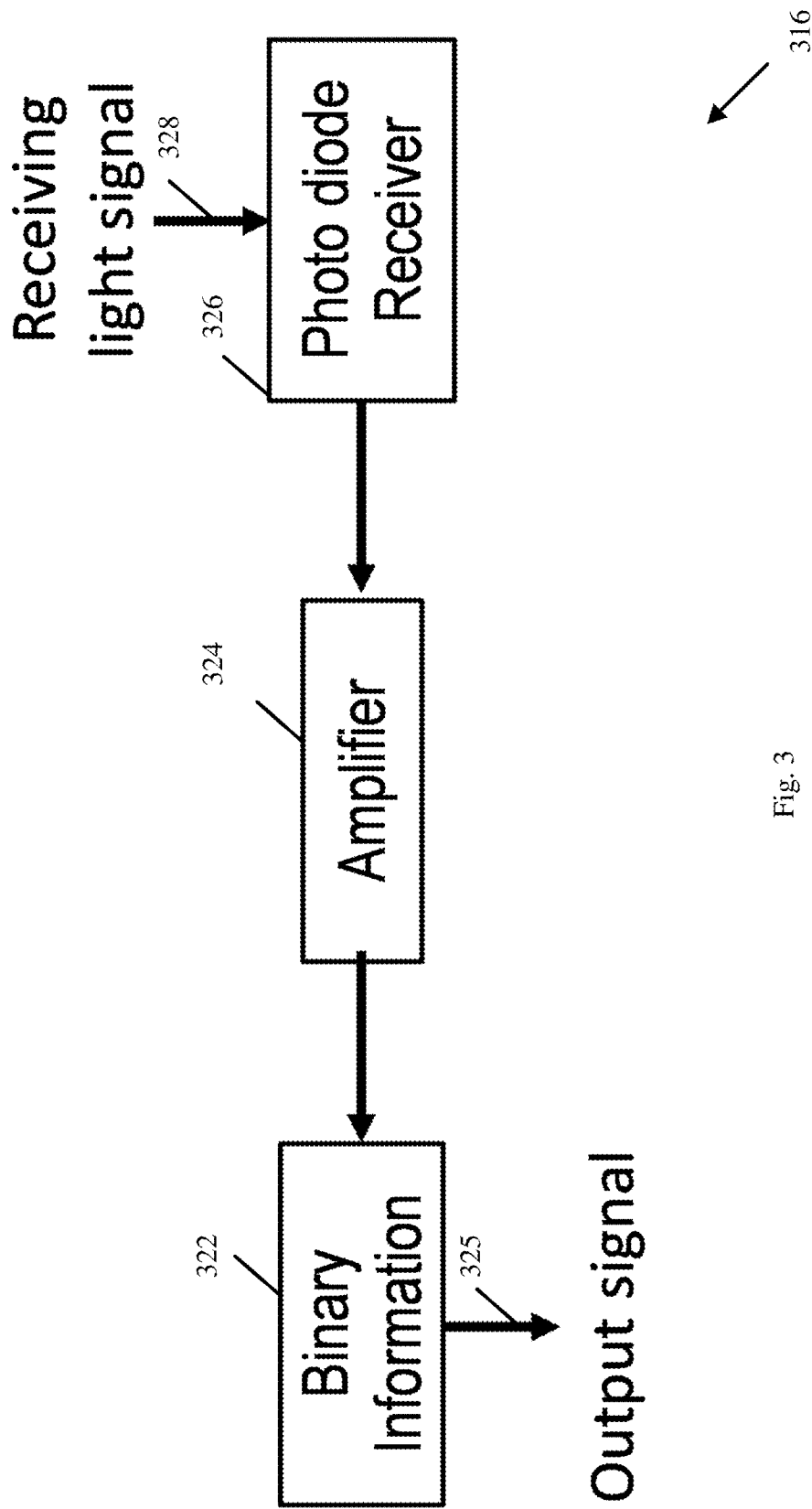
FIG. 3 is a schematic illustration of a light detector, in accordance with some demonstrative aspects.

Reference is made to FIG. 3, which schematically illustrates a light detector 316, in accordance with some demonstrative aspects. For example, light detector 113 (FIG. 1) may be configured to include one or more elements of light detector 316, and/or to perform one or more operations and/or functionalities of light detector 316.

In some demonstrative aspects, as shown in FIG. 3, light detector 316 may include a photo diode receiver 326 to receive a light signal 328, e.g., of a received VLC transmission.

For example, photo diode receiver 326 may be configured to convert light of the received light signal 328 into an electrical current signal. In one example, photo diode receiver 326 may include a semiconductor device, e.g., with a p-n junction, which may be configured to convert the light of the received light signal 328 into an electrical current.

In some demonstrative aspects, as shown in FIG. 3, light detector 316 may include an amplifier 324 configured to amplify the electrical current signal from photo diode receiver 326.

In some demonstrative aspects, as shown in FIG. 3, light detector 316 may include a demodulator 322 to generate an output signal 325, for example, by extracting data, e.g., binary information, from the amplified signal generated by amplifier 324. For example, output signal 325 may include demodulated data of a received VLC transmission, e.g., based on the received light signal 328.

Referring back to FIG. 1, in some demonstrative aspects, light communicator 114 may be implemented to provide one or more technical advantages for wirelessly transferring data between devices.

In some demonstrative aspects, light communicator 114 may be implemented to provide a technical solution, which may have one or more advantages, for example, over Inter-device wired data transfer mechanisms, which may be configured for data transfer via one or more wired connections.

For example, one solution for wired data transfer may utilize Universal Serial Bus (USB) drives, e.g., for inter-device wired data transfer. However, the USB technology may support a limited data rate, e.g., up to about 40 Giga bits per second (Gbps). Additionally, the USB technology may not be able to support some use cases and/or implementations, for example, web-based use cases, e.g., uploading data to the web and/or downloading data from the web.

For example, another solution for wired data transfer may utilize high-speed ethernet ports. However this solution may be relatively expensive and/or may be limited to some types of devices, e.g., laptops or PCs.

In some demonstrative aspects, light communicator 114 may be implemented to provide a technical solution, which may have one or more advantages, for example, over radio-based wireless communication mechanisms, which may be configured for data transfer via radio signals communicated over one or more wireless connections.

For example, some wireless communication technologies, e.g., according to WiFi standards and/or protocols. For example, WiFi connectivity may be utilized for web upload/download use cases. However, Wi-Fi connectivity may be limited in terms of supported bandwidth and, accordingly, may not be suitable for very large, e.g., huge, data transfers. For example, Wi-Fi connectivity may support a limited data rate, e.g., up to about 30 Gbps.

In some demonstrative aspects, light communicator 114 may be configured to implement a VLC technology, e.g., the Li-Fi technology and/or any other VLC technology, for example, to provide a technical solutions supporting high data rates. For example, the VLC technology, e.g., the Li-Fi technology, may support ultra-high speed data rates, e.g., up to 100 Gbps or even more. For example, the VLC technology, e.g., the Li-Fi technology, may be implemented to enhance data transfer, e.g., in addition to or instead of, wired connectivity and/or radio-based wireless connectivity solutions.

For example, VLC technology, e.g., LiFi technology, may be implemented in indoor locations, for example, in cabins, offices, and/conference rooms, for example, by implementing VLC light sources, e.g., Li-Fi light sources. In one example, the VLC technology may be backed up with conventional connectivity options, for example, radio-based wireless communication solutions, e.g., in case of dynamic tracking. For example, VLC devices may be required to be in vicinity of each other, e.g., to establish near field communication links, for example, for inter-device transfers.

In some demonstrative aspects, light communicator 114 may be configured to implement a VLC technology, e.g., the Li-Fi technology and/or any other VLC technology, for example, to provide a technical solution to support ultra-high speed data transfer, and/or a highly secured data transfer, e.g., compared to other wireless connectivity techniques.

In some demonstrative aspects, light communicator 114 may be configured to implement a VLC technology, e.g., the Li-Fi technology and/or any other VLC technology, for example, to provide a technical solution to support a large amount of data transfers, e.g., among servers.

In some demonstrative aspects, light communicator 114 may be configured to implement a VLC technology, e.g., the Li-Fi technology and/or any other VLC technology, for example, to provide a technical solution to support ultra-speed web connectivity.

In some demonstrative aspects, light communicator 114 may be configured to communicate modulated light of a VLC transmission in a range of VLC directions, e.g., as described below.

In some demonstrative aspects, the VLC transmission may include a VLC communication 172 with the ceiling VLC AP device 170, e.g., as described below.

In some demonstrative aspects, the VLC transmission may include a Line of Sight (LoS) transmission 142 in a LoS with another computing device, for example, with computing device 140, e.g., as described below.

In other aspects, the VLC transmission may include any other additional or alternative transmission in any other direction.

In some demonstrative aspects, for example, in some use cases, scenarios, and/or implementations, there may be a need to address one or more technical issues for efficiently implementing one or more light communicators, e.g., light communicator 114, in a computing device, e.g., as described below.

In one example, a placement of a light communicator within a computing device housing may affect performance of the light communicator, for example, in terms of data rates, for example, when communicating with one or more devices in one or more directions.

In some demonstrative aspects, computing device 102 may be implemented to provide a technical solution for implementing light communicator 114, for example, within a computing device housing of computing device 102, for example, while supporting high performance of the light communicator 114, e.g., as described below.

In some demonstrative aspects, light communicator 114 may be configured to extend outward from a side-wall surface of the computing device housing of device 102, for example, to communicate the modulated light of the VLC transmission in the range of VLC directions, e.g., as described below.

Figure 4:
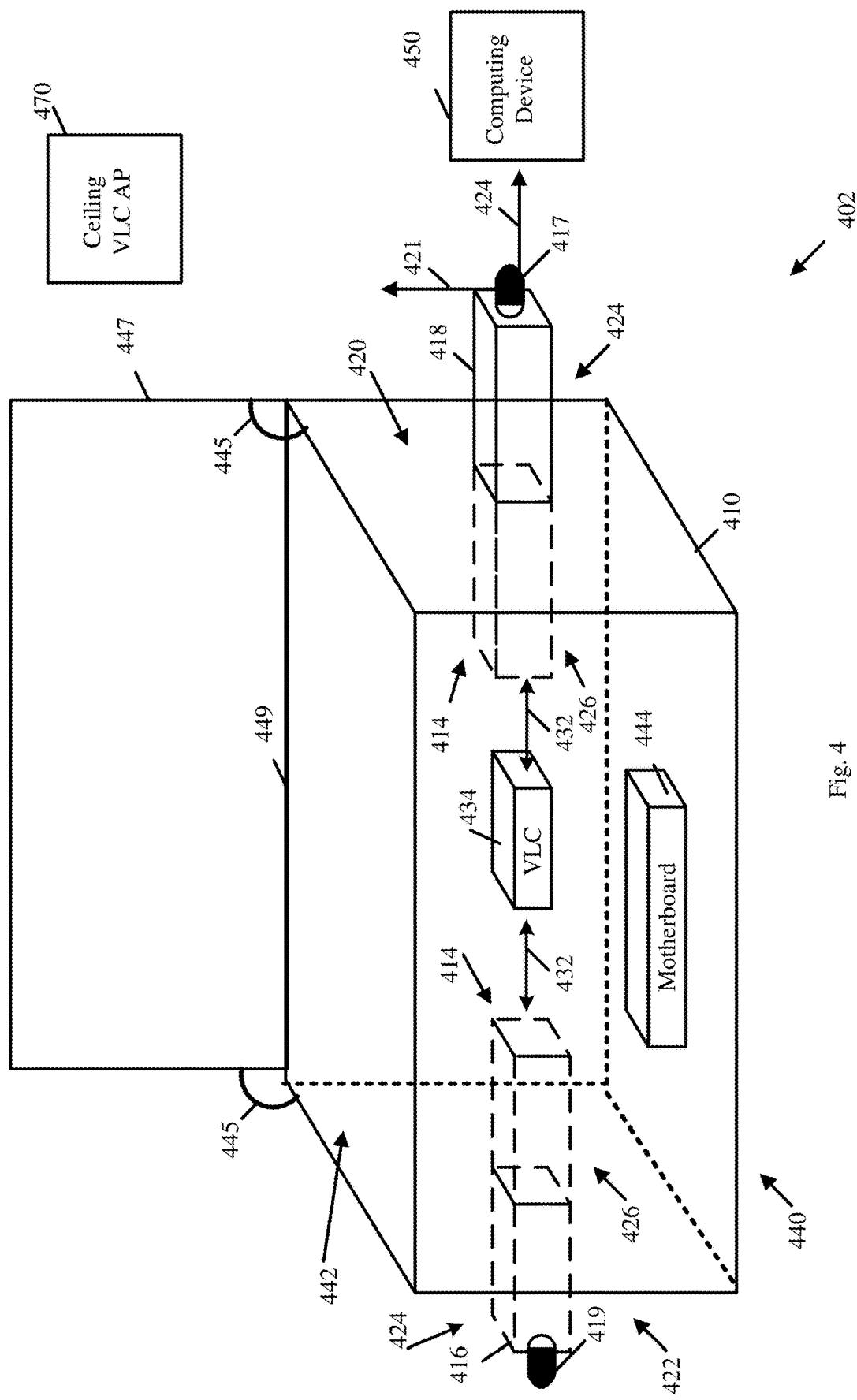
FIG. 4 is a schematic illustration of a computing device, in accordance with some demonstrative aspects.

Reference is made to FIG. 4, which schematically illustrates a computing device 402. For example, the computing device 102 (FIG. 1) may be configured to include one or more elements of computing device 402, and/or to perform one or more operations and/or functionalities of computing device 402.

In some demonstrative aspects, as shown in FIG. 4, computing device 402 may include a computing device housing 410 configured to house a motherboard 444 of the computing device 402. For example, motherboard 444 may include at least one processor to execute operations of the computing device 402, and/or at least one memory to store information processed by the processor. In one example, motherboard 444 may include processor 191 (FIG. 1) and/or memory 194 (FIG. 1).

In some demonstrative aspects, as shown in FIG. 4, computing device housing 410 may include a base surface 440, a top surface 442, e.g., opposite to the base surface 440, and a side-wall surface 420, which may extend, for example, between the base surface 440 and the top surface 442.

In some demonstrative aspects, as shown in FIG. 4, the side-wall surface 420 may be substantially perpendicular to the base surface 440.

In some demonstrative aspects, as shown in FIG. 4, computing device 402 may include a laptop, e.g., as described below.

In some demonstrative aspects, as shown in FIG. 4, computing device housing 410 may include a laptop base housing including, for example, a hinge portion 445 to rotatably connect the laptop base housing to a laptop cover housing 447 relative to a rotation axis 449.

In some demonstrative aspects, as shown in FIG. 4, the side-wall surface 420 of the housing 410 may be substantially perpendicular to the rotation axis 449 of the laptop cover housing.

In other aspects, computing device 402 may include a smartphone. For example, computing device housing 410 may include a smartphone housing.

In other aspects, computing device 402 may include any other type of computing device, and/or the computing device housing 410 may include a housing configured for any other type of computing device.

In some demonstrative aspects, as shown in FIG. 4, computing device 402 may include at least one light communicator 414, e.g., as described below.

For example, light communicator 414 may be configured to include one or more elements of light communicator 114

(FIG. 1), and/or to perform one or more operations and/or functionalities of light communicator 114 (FIG. 1).

In some demonstrative aspects, as shown in FIG. 4, light communicator 414 may be configured to extend outward from the side-wall surface 420 of the housing 410, for example, to communicate modulated light of a VLC transmission in a range of VLC directions, e.g., as described below.

In some demonstrative aspects, the range of VLC directions may include a 90 degree range of directions, e.g., as described below.

In some demonstrative aspects, as shown in FIG. 4, the range of VLC directions may include a 90 degree range of directions, for example, between a first direction 421 and a second direction 417, e.g. as described below.

In some demonstrative aspects, as shown in FIG. 4, the first direction 421 may be substantially parallel to the side-wall surface 420.

In some demonstrative aspects, as shown in FIG. 4, the second direction 424 may be substantially perpendicular to the side-wall surface 420.

In some demonstrative aspects, light communicator 414 may be configured to communicate the modulated light including, for example, light having a wavelength in a range between 390 nm and 780 nm, e.g., as described above.

In other aspects, light communicator 414 may be configured to communicate the modulated light of any other spectrum.

In some demonstrative aspects, light communicator 414 may be configured to communicate the modulated light including, for example, OOK modulated light, e.g., as described above.

In other aspects, the modulated light of the VLC transmission may be modulated according to any other modulation technique.

In some demonstrative aspects, the VLC transmission may include a Li-Fi transmission according to a Li-Fi Standard and/or protocol.

In other aspects, the VLC transmission may include any other type of VLC transmission, e.g., according to any other standard and/or protocol.

In some demonstrative aspects, light communicator 414 may be configured to communicate the VLC transmission, for example, as a VLC communication with a ceiling VLC AP device 470.

In some demonstrative aspects, light communicator 414 may be configured to communicate the VLC transmission with the ceiling VLC AP device 470, for example, in VLC direction 421.

In some demonstrative aspects, light communicator 414 may be configured to communicate the VLC transmission, for example, as a LoS transmission in a LoS with another computing device 450, for example, in VLC direction 424.

In some demonstrative aspects, as shown in FIG. 4, the light communicator 414 may be switchable between a retracted state 426 and an extended state 424, e.g., as described below.

In some demonstrative aspects, as shown in FIG. 4, when at the retracted state 426, the light communicator 414 may not substantially extend outward from the side-wall surface 420 of the housing 410.

In some demonstrative aspects, as shown in FIG. 4, when at the extended state 424, the light communicator may extend outward from the side-wall surface 420 of the housing 410.

In some demonstrative aspects, as shown in FIG. 4, when at the extended state 424, the light communicator 414 may be able to communicate VLS transmissions, for example, in the range of VLC directions, e.g., including VLC direction 421 and VLC direction 424, e.g., as described below.

In some demonstrative aspects, as shown in FIG. 4, computing device 402 may include a spring loaded connector 432 to electrically connect the light communicator 414 to a VLC circuit 434, e.g., as described below.

In some demonstrative aspects, the spring-loaded connector 432 may be switchable between the retracted state 426 and the extended state 424.

In some demonstrative aspects, the spring-loaded connector 432 may include a pogo pin connector, e.g., as described below.

In other aspects, the spring-loaded connector 432 may include any other type of connector.

In some demonstrative aspects, the spring-loaded connector 432 may be configured to utilize a push IN/OUT feature, which may enable a user of the computing device 402 to selectively switch the light communicator 414 between the retracted state 426 and the extended state 424.

For example, the light communicator 414 may be maintained at the retracted state 426, for example, when VLC communication is not performed.

For example, the light communicator 414 may be extended by the user to the extended state 424, for example, when VLC communication is to be performed.

In some demonstrative aspects, the extended state 424 of light communicator 414 may be configured support improved signal strength of VLC communications performed by the light communicator 414.

In some demonstrative aspects, the extended state 424 of light communicator 414 may be configured support a relative wide coverage of VLC directions, e.g., in a VLC range covering at least the VLC directions between VLC direction 421 and VLC direction 424.

In some demonstrative aspects, the extended state 424 of light communicator 414 may be configured support a relative wide coverage of VLC directions, for example, to provide a technical solution for VLC over a an LoS communication link.

In some demonstrative aspects, light communicator 414 may be configured to perform VLC communications, for example, also in case there is no LoS, for example, as light may bounce off one or more surfaces.

In some demonstrative aspects, as shown in FIG. 4, computing device 402 may include a first light communicator 414, which may include a light emitter 418 configured to emit modulated light of a transmitted VLC transmission. For example, light emitter 418 may be configured to include one or more elements of light emitter 118 (FIG. 1), and/or to perform one or more operations and/or functionalities of light emitter 118 (FIG. 1).

In some demonstrative aspects, as shown in FIG. 4, light emitter 418 may include a LED 417.

In some demonstrative aspects, as shown in FIG. 4, computing device 402 may include a first light communicator 414, which may include a light detector 416 configured to receive modulated light of a received VLC transmission. For example, light detector 416 may be configured to include one or more elements of light detector 113 (FIG. 1), and/or to perform one or more operations and/or functionalities of light detector 113 (FIG. 1).

In some demonstrative aspects, as shown in FIG. 4, light emitter 418 may be configured to extend from a first side-wall surface 420 of the housing 410, for example, on a first side of the housing 410.

In some demonstrative aspects, as shown in FIG. 4, light detector 416 may be configured to extend from a second side-wall surface 422 of the housing 410, for example, on a second side of the housing 410.

In some demonstrative aspects, as shown in FIG. 4, side-wall surface 422 may be opposite to side-wall surface 420.

In some demonstrative aspects, as shown in FIG. 4, computing device 402 may include one or more VLC components, e.g., Li-Fi components. For example, computing device 402 may include the LED 417 as a transmitter of light emitter 418, and a photo detector 419 as a receiver of light detector 416.

In some demonstrative aspects, computing device 402 may be configured to implemented one or more VLC components, e.g., light emitter 418 and/or photo detector 419, which may be placed, for example, near a base north of the computing device 402, for example, at a Z-wall of computing device housing 410.

In some demonstrative aspects, for example, light emitter 418 and/or photo detector 419 may be positioned close to a back surface under axis 449.

For example, this positioning of the light emitter 418 and/or photo detector 419 may provide a technical solution to support a scalable implementation, e.g., supporting VLC communication across multiple form factors of the computing device 402.

In some demonstrative aspects, computing device 402 may be configured to support VLC transmissions via light emitter 418 and/or light detector 416 at various device modes of computing device 402, for example, an open lid mode, a closed lid mode, and/or tablet/smartphone mode, for example, without substantially degrading performance of the VLC transmissions.

For example, in case of an implementation of computing device 402 as a laptop, e.g., including the laptop cover housing 447, the positioning of the light emitter 418 and/or photo detector 419 may provide a technical solution supporting VLC communication across multiple rotation states of the laptop cover housing 447 relative to a rotation axis 449.

For example, the positioning of the light emitter 418 and/or photo detector 419 may provide a technical solution supporting VLC communication, for example, VLC inter device transfers with computing device 450 via VLC direction 424, and/or VLC web data transfers with ceiling VLC AP 470 via VLC direction 424.

For example, the positioning of the light emitter 418 and/or photo detector 419 may provide a technical solution supporting the VLC communications via VLC direction 424 and/or via VLC direction 424, for example, regardless of whether the laptop cover housing 447 is at an open position or a closed position.

Figure 5:
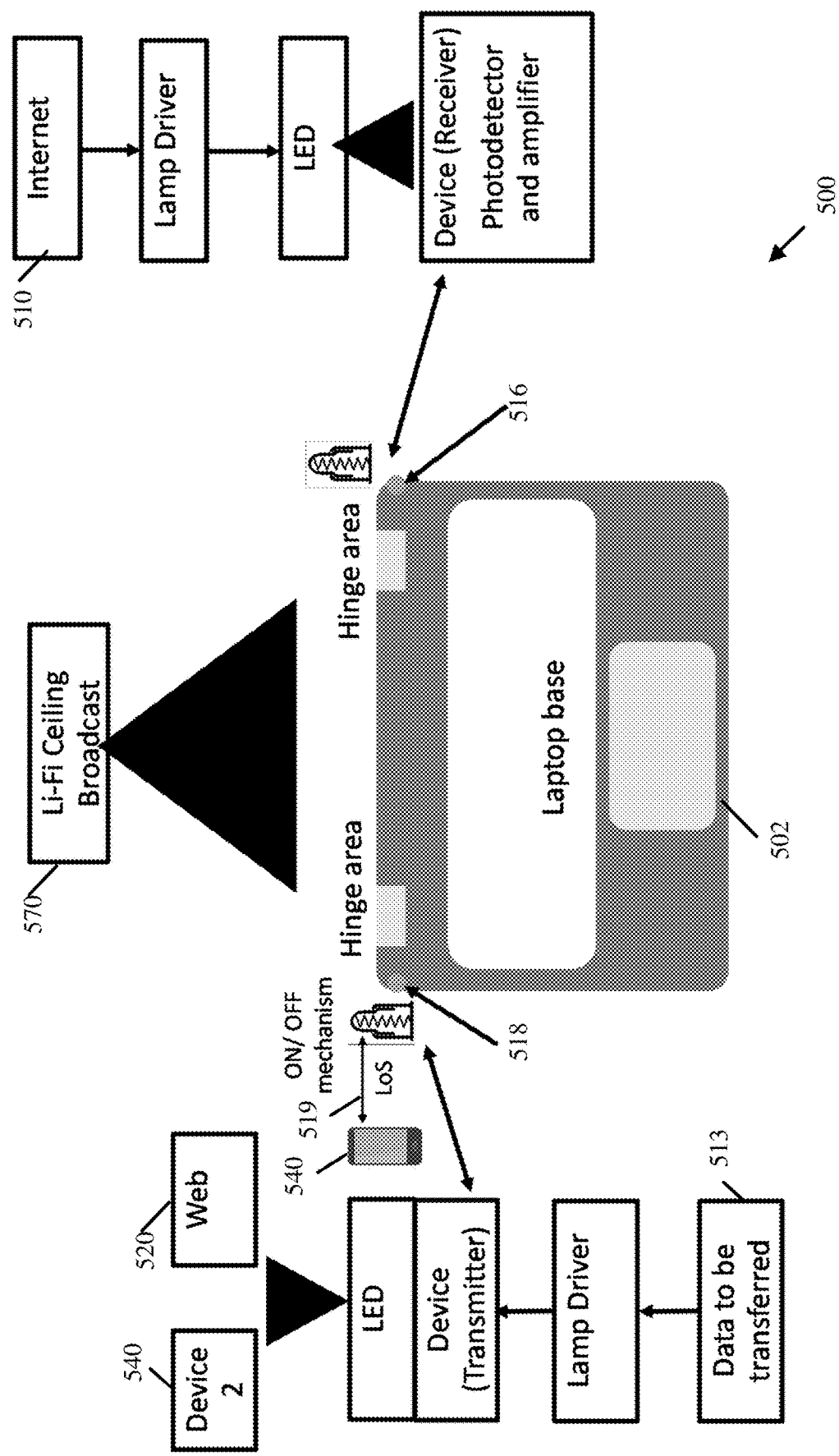
FIG. 5 is a schematic illustration of a computing device configured for Visible Light Communication (VLC), in accordance with some demonstrative aspects.

Reference is made to FIG. 5, which schematically illustrates a computing device 502 configured for VLC. For example, computing device 102 (FIG. 1) may be configured to include one or more elements of computing device 502, and/or to perform one or more operations and/or functionalities of computing device 502.

In some demonstrative aspects, the computing device 502 may include a laptop device.

In some demonstrative aspects, as shown in FIG. 5, computing device 502 may include a light emitter 518, which may be extended from a first side-wall surface of computing device 502.

In some demonstrative aspects, as shown in FIG. 5, computing device 502 may include a light detector 516, which may be extended from a second side-wall surface of computing device 502.

For example, as shown in FIG. 5, the first side-wall surface may be opposite to the second side-wall surface.

In some demonstrative aspects, as shown in FIG. 5, light emitter 518 may be configured to transmit data 513 in a VLC transmission, e.g., to a VLC receiver.

In some demonstrative aspects, as shown in FIG. 5, the data 513 may include, for example, data to be uploaded to the web.

In some demonstrative aspects, as shown in FIG. 5, the data 513 may include, for example, data to be transferred to another computing device 540. In one example, the computing device 540 may include a smartphone that supports VLC communication.

In some demonstrative aspects, as shown in FIG. 5, light emitter 518 may be configured to transmit data 513 to computing device 540, for example, via a LoS link 519, between light emitter 518 and the computing device 540.

In some demonstrative aspects, as shown in FIG. 5, light detector 516 may be configured to receive data in a VLC transmission, e.g., from a VLC transmitter.

In some demonstrative aspects, as shown in FIG. 5, light detector 516 may be configured to download the data from the Internet 510.

In some demonstrative aspects, as shown in FIG. 5, light detector 516 may be configured to receive the data, for example, from a ceiling VLC AP 570.

In some demonstrative aspects, as shown in FIG. 5, light emitter 518 may be able to communicate with the ceiling VLC AP 570.

In some demonstrative aspects, as shown in FIG. 5, light detector 516 and/or light emitter 518 may be configured to extend from a sidewall of a housing of computing device 502, for example, to provide a technical solution supporting transmission of VLC transmissions by the light emitter 518 and/or reception of VLC transmissions by the light detector 516.

In some demonstrative aspects, as shown in FIG. 5, light emitter 518 may be configured to extend from the sidewall of the housing of computing device 502, for example, to provide a technical solution supporting transmission of VLC transmissions by the light emitter 518, e.g., via a LoS direction with computing device 540 and/or via a ceiling direction with VLC AP device 570.

In some demonstrative aspects, as shown in FIG. 5, light emitter 518 may be configured to extend from the sidewall of the housing of computing device 502, for example, to provide a technical solution supporting reception of VLC transmissions by the light detector 516, e.g., via a LoS direction with computing device 540 and/or via a ceiling direction with VLC AP device 570.

In some demonstrative aspects, as shown in FIG. 5, light emitter 518 may be configured to extend from the sidewall of the housing of computing device 502, for example, to provide a technical solution supporting communication of VLC transmissions at multiple different laptop modes, e.g., at an open lid mode, and/or a closed lid mode.

Figure 6:
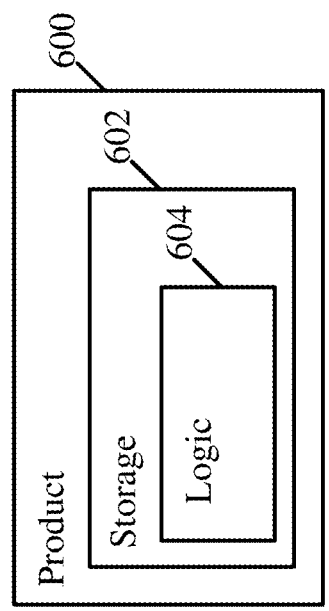
FIG. 6 is a schematic illustration of a product of manufacture, in accordance with some demonstrative aspects.

Reference is made to FIG. 6, which schematically illustrates a product of manufacture 600, in accordance with some exemplary aspects. Product 600 may include one or more tangible computer-readable ("machine-readable") non-transitory storage media 602, which may include computer-executable instructions, e.g., implemented by logic 604, operable to, when executed by at least one computer processor, enable the at least one computer processor to implement one or more operations at device 102 (FIG. 1), a light communicator, e.g., light communicator 114 (FIG. 1), a light emitter, e.g., light emitter 118 (FIG. 1), and/or a light detector, e.g., light detector 113 (FIG. 1); to cause device 102 (FIG. 1), a light communicator, e.g., light communicator 114 (FIG. 1), a light emitter, e.g., light emitter 118 (FIG. 1), and/or a light detector, e.g., light detector 113 (FIG. 1), to perform, trigger and/or implement one or more operations and/or functionalities; and/or to perform, trigger and/or implement one or more operations and/or functionalities described with reference to the FIGS. 1, 2, 3, 4, and/or 5, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 600 and/or machine-readable storage media 602 may include one or more types of computer-readable storage media capable of storing data, including volatile memory, non-volatile memory, removable or non-removable memory, erasable or non-erasable memory, writeable or re-writeable memory, and the like. For example, machine-readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a Solid State Drive (SSD), a disk, a drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 604 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language.

EXAMPLES

The following examples pertain to further aspects.

Example 1 includes an apparatus comprising a computing device housing configured to house a motherboard of a computing device, the computing device housing comprising a base surface, a top surface opposite to the base surface, and a side-wall surface between the base surface and the top surface; and a light communicator configured to extend outward from the side-wall surface of the computing device housing to communicate modulated light of a Visible Light Communication (VLC) transmission in a range of VLC directions, the range of VLC directions comprising a 90 degree range of directions between a first direction parallel to the side-wall surface and a second direction perpendicular to the side-wall surface.

Example 2 includes the subject matter of Example 1, and optionally, wherein the light communicator is switchable between a retracted state and an extended state, wherein at the retracted state the light communicator does not extend outward from the side-wall surface of the housing, wherein at the extended state the light communicator extends outward from the side-wall surface of the housing.

Example 3 includes the subject matter of Example 2, and optionally, comprising a spring-loaded connector to electrically connect the light communicator to a VLC circuit, the spring-loaded connector switchable between the retracted state and the extended state.

Example 4 includes the subject matter of Example 3, and optionally, wherein the spring-loaded connector comprises a pogo pin connector.

Example 5 includes the subject matter of any one of Examples 1-4, and optionally, wherein the light communicator comprises a light emitter configured to emit modulated light of a transmitted VLC transmission.

Example 6 includes the subject matter of Example 5, and optionally, comprising a modulator to generate a modulated signal based on data to be transmitted in the transmitted VLC transmission, wherein the light emitter is configured to emit the modulated light of the VLC transmission based on the modulated signal.

Example 7 includes the subject matter of Example 5 or 6, and optionally, wherein the light emitter comprises a Light Emitting Diode (LED).

Example 8 includes the subject matter of any one of Examples 1-7, and optionally, wherein the light communicator comprises a light detector configured to receive modulated light of a received VLC transmission.

Example 9 includes the subject matter of Example 8, and optionally, comprising a demodulator to generate demodulated data based on the modulated light of the received VLC transmission.

Example 10 includes the subject matter of any one of Examples 1-9, and optionally, comprising a light emitter configured to emit modulated light of a transmitted VLC transmission, and a light detector configured to receive modulated light of a received VLC transmission, wherein the light emitter is configured to extend from a first side-wall surface of the housing, and the light detector is configured to extend from a second side-wall surface of the housing.

Example 11 includes the subject matter of Example 10, and optionally, wherein the second side-wall surface is opposite to the first side-wall surface.

Example 12 includes the subject matter of any one of Examples 1-11, and optionally, wherein the modulated light of the VLC transmission comprises On-Off-Keying (OOK) modulated light.

Example 13 includes the subject matter of any one of Examples 1-12, and optionally, wherein the VLC transmission comprises a VLC communication with a ceiling VLC Access Point (AP) device.

Example 14 includes the subject matter of any one of Examples 1-12, and optionally, wherein the VLC transmission comprises a Line of Sight (LoS) transmission in a LoS with another computing device.

Example 15 includes the subject matter of any one of Examples 1-14, and optionally, wherein the computing device housing comprises a laptop base housing comprising a hinge portion to rotatably connect the laptop base housing to a laptop cover housing relative to a rotation axis, wherein the side-wall surface of the housing is perpendicular to the rotation axis.

Example 16 includes the subject matter of any one of Examples 1-14, and optionally, wherein the computing device housing comprises a smartphone housing.

Example 17 includes the subject matter of any one of Examples 1-16, and optionally, wherein the side-wall surface is perpendicular to the base surface.

Example 18 includes the subject matter of any one of Examples 1-17, and optionally, wherein the modulated light comprises light having a wavelength in a range between 390 nanometer (nm) and 780 nm.

Example 19 includes the subject matter of any one of Examples 1-18, and optionally, wherein the VLC transmission comprises a Light Fidelity (Li-Fi) transmission according to a Li-Fi Standard.

Example 20 comprises a computing device comprising the apparatus of any one of Examples 1-19.

Example 21 comprises a computing device comprising a motherboard, an input to receive an input from a user, an output to provide an output to the user, and the apparatus of any one of Examples 1-19.

Example 22 comprises a wireless communication device comprising the apparatus of any one of Examples 1-19.

Example 23 comprises an apparatus comprising means for executing any of the described operations of Examples 1-19.

Example 24 comprises a product comprising one or more tangible computer-readable non-transitory storage media comprising computer-executable instructions operable to, when executed by at least one processor, enable the at least one processor to cause a device to perform any of the described operations of Examples 1-19.

Example 25 comprises an apparatus comprising: a memory interface; and processing circuitry configured to: perform any of the described operations of Examples 1-19.

Example 26 comprises a method comprising any of the described operations of Examples 1-19.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a housing configured to house a motherboard of a computing device, the housing comprising a base surface, a top surface opposite to the base surface, and a side-wall surface between the base surface and the top surface; and
a light communicator switchable between a retracted state and an extended state, wherein at the retracted state the light communicator does not extend outward from the side-wall surface of the housing, wherein at the extended state the light communicator is configured to extend outward from the side-wall surface of the housing to communicate modulated light of a Visible Light Communication (VLC) transmission in a range of VLC directions, the range of VLC directions comprising a 90 degree range of directions between a first direction parallel to the side-wall surface and a second direction perpendicular to the side-wall surface.

2. The apparatus of claim 1 comprising a spring-loaded connector to electrically connect the light communicator to a VLC circuit, the spring-loaded connector switchable between the retracted state and the extended state.

3. The apparatus of claim 2, wherein the spring-loaded connector comprises a pogo pin connector.

4. The apparatus of claim 1, wherein the light communicator comprises a light emitter configured to emit modulated light of a transmitted VLC transmission.

5. The apparatus of claim 4 comprising a modulator to generate a modulated signal based on data to be transmitted in the transmitted VLC transmission, wherein the light emitter is configured to emit the modulated light of the transmitted VLC transmission based on the modulated signal.

6. The apparatus of claim 4, wherein the light emitter comprises a Light Emitting Diode (LED).

7. The apparatus of claim 1, wherein the light communicator comprises a light detector configured to receive modulated light of a received VLC transmission.

8. The apparatus of claim 7 comprising a demodulator to generate demodulated data based on the modulated light of the received VLC transmission.

9. The apparatus of claim 1 comprising a light emitter configured to emit modulated light of a transmitted VLC transmission, and a light detector configured to receive modulated light of a received VLC transmission, wherein the light emitter is configured to extend from a first side-wall surface of the housing, and the light detector is configured to extend from a second side-wall surface of the housing.

10. The apparatus of claim 9, wherein the second side-wall surface is opposite to the first side-wall surface.

11. The apparatus of claim 1, wherein the modulated light of the VLC transmission comprises On-Off-Keying (OOK) modulated light.

12. The apparatus of claim 1, wherein the VLC transmission comprises a VLC communication with a ceiling VLC Access Point (AP) device.

13. The apparatus of claim 1, wherein the VLC transmission comprises a Line of Sight (LoS) transmission in a LoS with another computing device.

14. The apparatus of claim 1, wherein the housing comprises a laptop base housing comprising a hinge portion to rotatably connect the laptop base housing to a laptop cover housing relative to a rotation axis, wherein the side-wall surface of the housing is perpendicular to the rotation axis.

15. The apparatus of claim 1, wherein the housing comprises a smartphone housing.

16. The apparatus of claim 1, wherein the side-wall surface is perpendicular to the base surface.

17. The apparatus of claim 1, wherein the modulated light comprises light having a wavelength in a range between 390 nanometer (nm) and 780 nm.

18. The apparatus of claim 1, wherein the VLC transmission comprises a Light Fidelity (Li-Fi) transmission according to a Li-Fi Standard.

19. A computing device comprising:
a motherboard;
an input to receive an input from a user;
an output to provide an output to the user;
a housing configured to house the motherboard, the housing comprising a base surface, a top surface opposite to the base surface, and a side-wall surface between the base surface and the top surface; and
a light communicator switchable between a retracted state and an extended state, wherein at the retracted state the light communicator does not extend outward from the side-wall surface of the housing, wherein at the extended state the light communicator is configured to extend outward from the side-wall surface of the housing to communicate modulated light of a Visible Light Communication (VLC) transmission in a range of VLC directions, the range of VLC directions comprising a 90 degree range of directions between a first direction parallel to the side-wall surface and a second direction perpendicular to the side-wall surface.

20. The computing device of claim 19 comprising a spring-loaded connector to electrically connect the light communicator to a VLC circuit, the spring-loaded connector switchable between the retracted state and the extended state.

21. The computing device of claim 19 comprising a light emitter configured to emit modulated light of a transmitted VLC transmission, and a light detector configured to receive modulated light of a received VLC transmission, wherein the light emitter is configured to extend from a first side-wall surface of the housing, and the light detector is configured to extend from a second side-wall surface of the housing.

22. An apparatus comprising:
housing means configured to house a motherboard of a computing device, the housing means comprising a base surface, a top surface opposite to the base surface, and a side-wall surface between the base surface and the top surface; and
light communication means switchable between a retracted state and an extended state, wherein at the retracted state the light communication means does not extend outward from the side-wall surface of the housing means, wherein at the extended state the light communication means is configured to extend outward from the side-wall surface of the housing means to communicate modulated light of a Visible Light Communication (VLC) transmission in a range of VLC directions, the range of VLC directions comprising a 90 degree range of directions between a first direction parallel to the side-wall surface and a second direction perpendicular to the side-wall surface.

23. The apparatus of claim 22 comprising connector means to electrically connect the light communication means to a VLC circuit, the connector means switchable between the retracted state and the extended state.

* * * * *